US011375267B2

(12) United States Patent
Zhang et al.

(10) Patent No.: US 11,375,267 B2
(45) Date of Patent: Jun. 28, 2022

(54) PLAYBACK RESUME BETWEEN MOBILE ENTERTAINMENT SYSTEM AND SET-TOP BOX

(71) Applicant: ARRIS Enterprises LLC, Suwanee, GA (US)

(72) Inventors: Zhejun Zhang, Shanghai (CN); Xiao Wang, Shanghai (CN); Chenqing Wu, Shanghai (CN); Huihui Xiao, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/760,226

(22) PCT Filed: Dec. 12, 2017

(86) PCT No.: PCT/CN2017/115737
§ 371 (c)(1),
(2) Date: Apr. 29, 2020

(87) PCT Pub. No.: WO2019/113804
PCT Pub. Date: Jun. 20, 2019

(65) Prior Publication Data
US 2020/0359059 A1 Nov. 12, 2020

(51) Int. Cl.
*H04N 21/43* (2011.01)
*H04N 21/2343* (2011.01)
(Continued)

(52) U.S. Cl.
CPC ... *H04N 21/43078* (2020.08); *H04N 21/2343* (2013.01); *H04N 21/6143* (2013.01); *H04N 21/64322* (2013.01)

(58) Field of Classification Search
CPC ......... H04N 21/64322; H04N 21/6143; H04N 21/2343
See application file for complete search history.

(56) References Cited

U.S. PATENT DOCUMENTS 7,344,084 B2 * 3/2008 DaCosta .......... H04N 21/47202
348/E7.071
8,255,959 B2 * 8/2012 Ito ...................... H04N 21/4333
725/100
(Continued)

FOREIGN PATENT DOCUMENTS

CN 102202355 9/2011
CN 102256177 11/2011
(Continued)

OTHER PUBLICATIONS

International Search Report dated Jul. 19, 2018 in International (PCT) Application No. PCT/CN2017/115737.

*Primary Examiner* — James R Sheleheda
(74) *Attorney, Agent, or Firm* — Wenderoth, Lind & Ponack, L.L.P.

(57) ABSTRACT

A set-top box receives media information including media identification and position information from a portable device in wireless communication with a mobile entertainment system. The media information is parsed, using a local or an internet based search, to locate the media information including the media identification and position information that matches a broadcast program or recorded media content from a network accessible to the mobile entertainment system. Upon locating the media information that matches the broadcast program or recorded media content, the matching broadcast program or recorded media content is downloaded and played on at least one of a display device or an audio receiver accessible to the set-top box or the headend of the IP, cable or satellite network.

20 Claims, 5 Drawing Sheets

(51) Int. Cl.
*H04N 21/61* (2011.01)
*H04N 21/643* (2011.01)

(56) References Cited

U.S. PATENT DOCUMENTS

| | | | | |
|---|---|---|---|---|
| 8,266,341 B2* | 9/2012 | Choi | ................ | H04N 21/41265 |
| | | | | 710/33 |
| 8,813,166 B2* | 8/2014 | Howarter | ........... | H04N 21/4126 |
| | | | | 725/153 |
| 9,584,860 B2* | 2/2017 | Dey | .................. | H04N 21/4402 |
| 10,701,428 B2* | 6/2020 | Alam | ............... | H04N 21/47217 |
| 2005/0076127 A1* | 4/2005 | Wilson | .................. | H04L 69/329 |
| | | | | 709/227 |
| 2005/0094031 A1* | 5/2005 | Tecot | ..................... | G11B 27/34 |
| | | | | 725/135 |
| 2007/0067808 A1* | 3/2007 | DaCosta | ............ | H04N 7/17318 |
| | | | | 348/E7.071 |
| 2008/0005770 A1* | 1/2008 | Acharya | ............ | H04N 21/6587 |
| | | | | 348/E7.071 |
| 2008/0134245 A1* | 6/2008 | DaCosta | ............ | H04N 21/6118 |
| | | | | 348/E7.071 |
| 2008/0134256 A1* | 6/2008 | DaCosta | ............ | H04N 21/6131 |
| | | | | 725/62 |
| 2008/0163330 A1* | 7/2008 | Sparrell | ............... | H04M 11/007 |
| | | | | 348/E7.071 |
| 2008/0209497 A1* | 8/2008 | Cordoba | .......... | H04N 21/47202 |
| | | | | 370/352 |
| 2009/0100465 A1 | 4/2009 | Kulakowski | | |
| 2010/0119208 A1* | 5/2010 | Davis | ............... | H04N 21/41407 |
| | | | | 386/291 |
| 2011/0307930 A1* | 12/2011 | Rouse | .............. | H04N 21/47202 |
| | | | | 725/98 |
| 2012/0166949 A1* | 6/2012 | Tischer | ................ | G11B 27/031 |
| | | | | 715/716 |
| 2015/0082347 A1* | 3/2015 | Pan | ...................... | H04N 21/812 |
| | | | | 725/38 |
| 2015/0128194 A1* | 5/2015 | Kuang | .............. | H04N 21/43615 |
| | | | | 725/81 |

FOREIGN PATENT DOCUMENTS

| | | |
|---|---|---|
| CN | 102546608 | 7/2012 |
| CN | 103079102 | 5/2013 |
| CN | 107277580 | 10/2017 |
| EP | 2 905 967 | 8/2015 |

\* cited by examiner

PLAYBACK RESUME BETWEEN MOBILE ENTERTAINMENT SYSTEM AND SET-TOP BOX

TECHNICAL FIELD

The present disclosure relates, in general, to techniques and equipment to resume playback of multimedia content from a mobile entertainment system to a set-top box (STB).

BACKGROUND

In today's busy environment of constant activity and multi-tasking, the ability to have access to video and audio entertainment while on-the-go is important. With current video or audio entertainment systems, for example, a sports fan can listen to a live broadcast of a sporting event on a car radio or entertainment system while driving. However, a problem occurs for the sports fan when he or she must interrupt the playing of the live broadcast because of various reasons, such as having to exit the vehicle to go into a store or restaurant; or simply having reached the destination and needing to exit the vehicle to complete other tasks. In some situations, it may be possible to begin listening to the broadcast again, when either returning to the vehicle or using another system broadcasting the sporting event. However, there is no way to return to the exact moment in which the live broadcast was turned off. Thus, the sports fan would have missed the actual portion of the broadcast that occurred from the ending point in the car or mobile entertainment system, and would have to rely on after-the-fact reporting of the events that occurred.

Similarly, with respect to a current live broadcast of a video, program, or previously recorded media such as a movie, while using a car or mobile entertainment system, if for some reason, the user is unable to complete watching the entire video, program, or previously recorded media prior to having to exit the vehicle, then the user will be unable to view the missed portion. Thus, the user's option, with respect to a live broadcast, is to complete the video program without access to the missed portion or wait for another broadcast of the video, if possible, in which there may be time to view the entire program.

It would be advantageous if a mobile entertainment system and method were provided that would allow playback of the media content to resume at the exact time or point in which the video or audio was initially turned off in the vehicle.

SUMMARY

The concepts disclosed herein provide examples of a set-top box, method and a non-transitory machine-readable medium that facilitate the resumption of playback of video or audio broadcast program and recorded media content using a set-top box.

In an example, a set-top box includes a network communication interface for communication over a wireless network, a processor coupled to the network communication interface, a memory accessible to the processor, and programming in the memory. Execution of the programming by the processor configures the set-top box to perform functions, including functions to receive media information from a mobile application of a portable handheld device having the media information obtained from a mobile entertainment system. The media information includes media identification and position information of multimedia content from a satellite or other network accessible to the mobile entertainment system. The programming further includes functions to parse the media information using at least one of a local based and an internet based search via at least one of a wired or wireless communication network of the set-top box or a headend of an IP, cable or satellite network to locate a broadcast program or recorded media content matching the media information. The programming further includes functions to play the previously recorded broadcast or media content, upon locating the media information that matches the broadcast program or recorded media content from a specific position indicated in the media information on at least one of a display device or an audio receiver accessible to the set-top box or the headend of the IP, cable or satellite network.

In another example, a method for resuming playback of a video or audio broadcast program and recorded media content using a set-top box includes recording media information including media identification and position information of multimedia content from, a network, for example, a satellite network accessible to a mobile entertainment system, and establishing a first wireless communication network link between the mobile entertainment system and a portable device, sending the recorded media information including the media identification and position information from the mobile entertainment system to the portable device, wherein the sent recorded media information is stored in a memory of the portable device using a mobile application. The method further includes establishing a second wireless communication network link between the portable device with a set-top box accessible to a headend of an IP, cable or satellite network, sending the stored media information including the media identification and position information from the portable device to the set-top box, and parsing the received media information including the media identification and position information using at least one of a local or an internet based search via the set-top box connected to at least one of a wireless communication network or the headend of the IP, cable or satellite network. The method further includes determining whether the parsed media information including the media identification and position information matches a broadcast program or recorded media content, and upon determining that the media information matches the broadcast program or recorded media content, playing the broadcast program or recorded media content from a specific position indicated in the media information on at least one of a display device or an audio receiver accessible to the set-top box and the headend of the IP, cable or satellite network.

In another example, a non-transitory machine-readable medium contains machine-readable programming instructions. The instructions cause a processor of a set-top box to perform functions to receive media information from a mobile application a portable handheld device having the media information obtained from a mobile entertainment system. The media information includes media identification and position information of multimedia content from, for example, a satellite network accessible to the mobile entertainment system. The instructions further cause the parse the media information using at least one of a local or an internet based search via at least one of a wireless communication network or a headend of an IP, cable or satellite network to locate a broadcast program or recorded media content matching the media information. Upon locating the media information that matches the broadcast program or recorded media content, the instructions cause the processor to play the broadcast program or recorded media content from a specific position indicated in the media information on at least one of a display device or an audio receiver accessible to the set-top box and the headend of the IP, cable or satellite network.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The figures depict one or more implementations in accordance with the present concepts, by way of example only, not by way of limitation. In the figures, like reference numbers refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
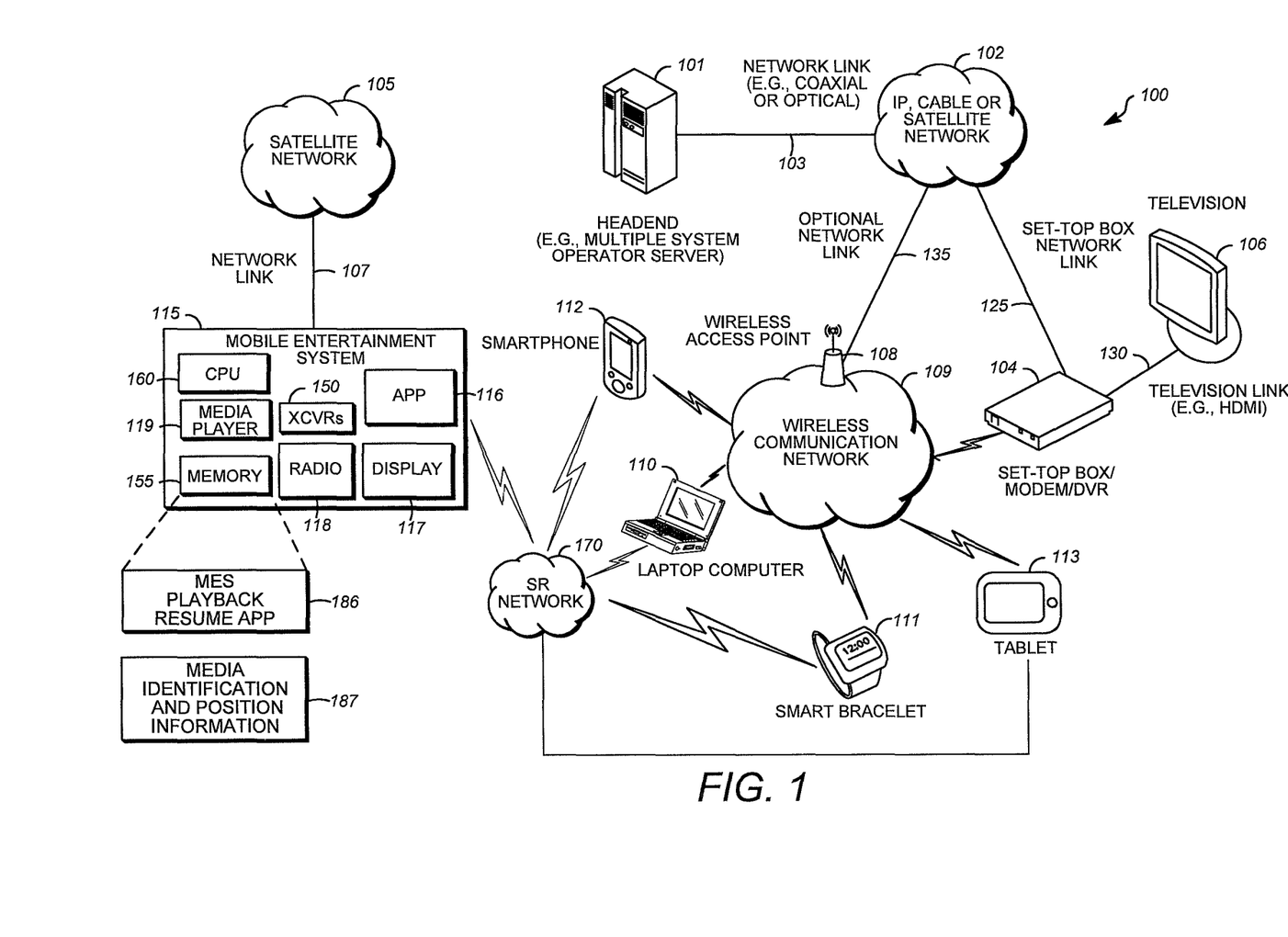
FIG. 1 is a block diagram of a system for resuming playback between a mobile entertainment system and a set-top box.

Shown in the block diagram of FIG. 1 is an example system 100 for resuming playback between a mobile entertainment system and a set-top box. The term mobile entertainment system is used throughout the description of the system 100 wherein a more specific example of the mobile entertainment system would include an entertainment system within any type of car, vehicle, or automobile. The system 100 includes a mobile entertainment system 115, at least one portable handheld device and a set-top box 104 that receives media content from a headend 101. The headend 101 receives communication signals (e.g., cable television signals), processes the television signals, and distributes the television signals for broadcast to a local region. As shown, headend 101 is connected to a television system network, such as an IP, cable or satellite network 102, via a network link 103. The cable or satellite network 102 includes Internet capabilities. The network link 103 can be a coaxial or optical connection.

In the example of FIG. 1, a mobile entertainment system 115 is located in, for example, a car or vehicle that is separate and not on a same network for content delivery as the set-top box 104. Alternatively, the satellite network 105 and IP, cable or satellite network 102 may be the same network. Specifically, the car or mobile entertainment system 115, having BlueTooth® and WiFi capability, may include a variety of components for audio and/or video entertainment for a user in the vehicle. The mobile entertainment system of the vehicle may include, for example, a media player 119 configured as a DVR or gaming console, a radio 118 for receiving audio broadcasts, and at least one display 117 such as a flat panel liquid crystal display (LCD) or light emitting diode (LED) display. The car or mobile entertainment system 115 is connected, via a network link 107, to a network, for example, a satellite network 105 for the delivery of multimedia content (e.g., audio and video streams) that is used within the mobile entertainment system 115. In the example, the network link 107 is a wireless satellite network link; however, in other examples, the network link 107 may establish a communication link to a WiFi or cellular data network instead of satellite network 105, for example.

Mobile entertainment system (MES) 115 may further include software applications 116 to permit communication with portable handheld devices such as a smartphone 112, laptop computer 110, smart bracelet 111 or tablet 113. Thus, the portable handheld devices would also include at least one software application 116 similar to that of the mobile entertainment system 115, shown as MES playback resume application 186. As shown, the MES playback resume application 186 is stored in a memory 155 for execution by a processor (CPU 160). The memory 155 further includes media identification and position information 187 to track where the user is in the audio and/or video media streams. The media identification and position information 187 can include an electronic broadcast code/ID, a time stamp, date or positional information as to the point in which the audio or video broadcast was ended, for example.

The MES 115 is also equipped with various wireless transceivers (XCVRs) 150 for communication via network link 107 to the satellite network 105 to receive audio and/or video media streams. The XCVRs 150 also allow the MES 115 to establish a wireless communication link, for example, via a short range (SR) 170 network with the various portable handheld devices of a user depicted in FIG. 1, such as smartphone 112, laptop computer 110, smart bracelet/watch 111, and tablet computer 113. The MES playback resume application 186 may transmit the media identification and position information 187 to the portable handheld device via the SR network 170 to enable the playback resume operations described herein.

In general, the term "application," as used herein, refers to logic embedded in hardware or software instructions, which can be written in a programming language, such as Java®, C, C++, C Sharp, for example. A software application can be compiled executable programs or written in interpreted programming languages, such as Perl, Visual Basic script, HTML, or JavaScript. Software applications may be callable from other applications. Generally, applications described herein refer to logical modules that may be merged with other modules or divided into sub-modules despite their physical organization. The applications can be stored in any type of computer readable medium or computer storage device and can be executed by one or more general purpose computers. In addition, the methods and processes disclosed herein can be alternatively be embodied in specialized computer hardware or an application specific integrated circuit (ASIC).

System 100 includes an example optical or cable network compatible video receiver and decoder (colloquially referred to as a "set-top box"), a modem and/or a digital video recorder (DVR) as shown generally at 104 in FIG. 1. For convenience, the device 104 is referred to as a set-top box (STB). Although the example STB 104 is shown as including these specific elements, it is contemplated that another STB may have more or fewer elements. STB 104 is in communication with headend 101 via the IP, cable or satellite network 102 through a set-top box network link 125 (e.g., coaxial or optical cable) and is also connected to a television 106 via television link 130, such as an HDMI connector. If the television 106 is equipped with a wireless network communication interface (e.g., a Smart TV), then television 106 can also be in communication with the wireless access point 108, in which case television 106 may operate in a manner similar to portable handheld devices 110, 111, 112, or 113. Although FIG. 1 shows wireless connections between the wireless access point 108 and the STB 104 and/or television 106, it is contemplated that these connections may be wired connections. For example, the wireless access point 108 may be a wireless router that may be used to implement both wired and wireless connections.

The example system 100 also includes a local area network, shown as wireless communication network 109, which includes a wireless access point 108 (e.g. WiFi access point/router and/or network gateway); although other in-home networking technologies may be used. Wireless communication network 109 can include, for example, a Bluetooth®, ZigBee®, or WiFi network. Alternatively, the wireless communication network can include a telecommunications network. System 100 also includes end user devices, including portable devices such as a laptop/personal computer 110, smartphone 112, smart bracelet 111 and a tablet computer 113. Wireless access point 108 enables the laptop computer 110, smartphone 112, smart bracelet 111 and tablet computer 113 to utilize services offered through the STB 104 and the connection of the STB 104 to the IP, cable or satellite network 102, such as for Internet access and media content distribution.

The wireless access point 108 can be a WiFi access point/router that indirectly connects to the IP, cable or satellite network 102 through a separate network gateway. However, the wireless access point 108 may optionally connect to the IP, cable or satellite network 102 via a network link 135. In this example, wireless access point 108 may be both a WiFi access point/router and a network gateway that directly connects to the IP, cable or satellite network 102. Such a network gateway is a data device that provides access between a wide area network such as 102 and the local wireless telecommunication network 109 at the premises (for use by devices communicating through the local on-premises network). The physical network link 135 to the IP, cable or satellite network 102 may be similar to set-top box 104, such as an optical fiber or cable link to a cable TV network. The wireless access point 108 provides routing, access, and other services for the end user equipment operating at the premises. The wireless access point 108 may also include sufficient storage to support media content, such as moving picture experts group (MPEG) transport streams, downloading operations, e.g. to obtain from servers, such as headend 101, or the like on the IP, cable or satellite network 102, store the content, and forward the content to end user devices on wireless communication network 109.

Figure 2:
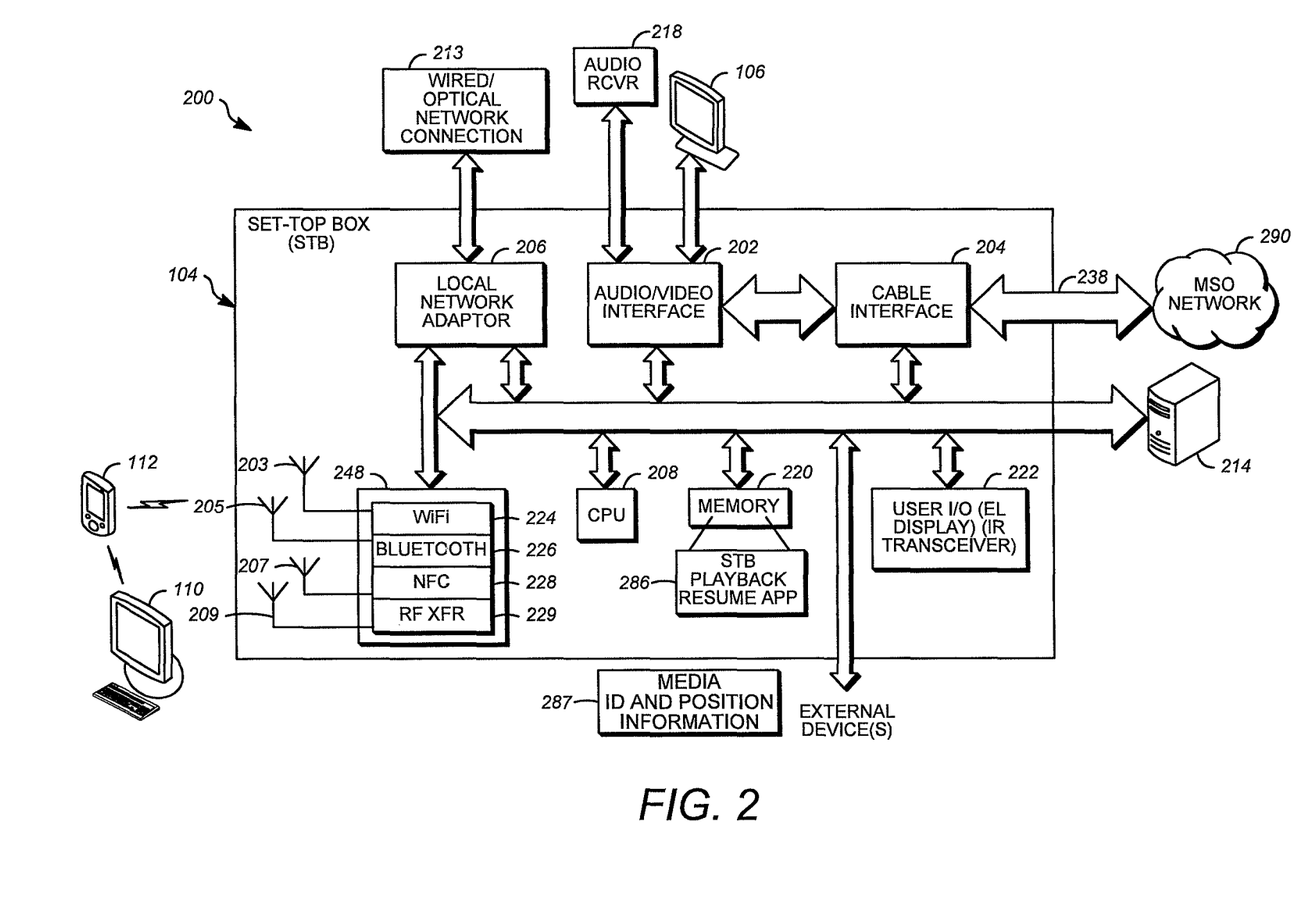
FIG. 2 is a block diagram of an example set-top box (STB), such as STB 104 of FIG. 1, in more detail.

FIG. 2 is a block diagram of an example set top box (STB), such as STB 104 of FIG. 1, in more detail. The STB 104 includes one or more wireless transceivers, a processor, input/output terminals, and a memory.

The example STB 104 includes an audio/video interface 202 for processing data, e.g. decoding an MPEG or HEVC video stream to output visual content for display on display device 106 and to stream audio content to display device 106 and/or audio receiver 218. The STB 104 also includes an interface for local communication with consumer premises equipment (CPE) devices, and in this example, that interface takes the form of a local network adapter 206 which includes a wired/optical communication port as well as wireless ports to WiFi transceiver 224, Bluetooth® transceiver 226, NFC transceiver 228 and an RF transceiver (labeled "RF XCVR") 229, such as a ZigBee® RF4CE transceiver. In this example, WiFi transceiver 224 may be a WiFi access point. The wired/optical network connection 213 may be coupled to the local network adaptor 206.

The STB 104 also includes cable interface 204 for receiving programming and Internet protocol (IP) packets from an edge serving office (ESO) (not shown). An ESO may be a headend or central office of a multiple service provider (MSO) 290, such as a cable, satellite, or telephone company. The IP packets may, for example, include HEVC streams, encapsulated MPEG transport streams, Windows Media streams or other audio/video streaming data. The video data received and processed by the STB 104 is collectively referred to herein as video streams. These streams may include MPEG transport streams from the cable interface 204, IP encapsulated MPEG or HEVC transport streams from the MSO 290 ESO, HEVC video streams, Windows Media video streams or other streaming video data. The circuitry of the audio/video interface 202 may include circuitry that decodes selected video streams to send decoded video data to the display device 106.

The MSO network 290 may be coupled to a cable input line 238 of the STB 104. In instances where the MSO 290 delivers a number of channels of content, such as sports channels, cooking show channels, history-related channels, premium movie channels, public service channels, traditional television network channels and the like, a viewer/user may select to view the different channels via the user I/O terminal 222 of the STB 104. The cable interface 204 may also send and receive data over the MSO network 290 to/from an ESO-associated server (not shown) and/or a content server (not shown) to obtain media content, such as the streaming graphical content, and possibly meta-data files or meta-data related instructions from the ESO server. In addition to the MSO network 290 sources of content, other sources of content include external devices 242, sources connected via a wired/optical connection 213, a computer or the like as other sources of content available through the cable input line 238. For example, the audio/video content may be provided to the STB 104 by audio and video content providers such as cable television companies, internet video and audio services, such as Netflix®, Roku®, Hulu®, CBS All Access®, Amazon® and the like, streaming audio services, such as Pandora®, iHeart® radio and the like, gaming sources, such a Xbox®, PlayStation®, Wii®, internet sources, as well as DVD players, CD players, cameras, computers, audio/video portable devices (e.g., iPods® and smartphones), and similar devices and services. In an alternate example, Internet Protocol Television (IPTV), which is the delivery of television content over computer networks based on Internet Protocol (IP), can be used as a source of multimedia content rather than through satellite and cable formats. The IPTV can be used in subscriber-based telecommunications networks to stream, video-on-demand (VOD) content through a STB, a computer or other device to allow viewing in real time or download to a device such as a computer or portable handheld device for viewing at a later time.

The STB 104 also includes circuits forming one or more processors to implement a CPU 208 and memory 220 for controlling operations of the STB 104, including executing programming instructions for performing the processing of media content and meta-data files, the processing of the STB playback resume application 286 as well as programming related to user input and control functions. As shown, memory 220 may include one or more memories and/or other program and data storage devices, for example, for storing media identification and position information 287; and instructions executable by the CPU 208, which in the example is the STB playback resume application 286. The memory 220 may also include program instructions, such as other software applications, user preference information, associated portable handheld device information, and the like.

The example STB 104 also includes a user I/O interface 222. The user I/O interface 222 may include an electroluminescent (EL), liquid crystal display (LCD) device, or light emitting diode (LED) display for displaying information to the user watching the display device 106. The user I/O interface 222 may also include an infrared (IR) receiver for receiving instructions from a user's remote control (not shown). Although not shown in detail, this IR receiver may be implemented as an IR transceiver and provide a communication channel for sending and receiving short-range optical communications between the STB 104 and one or more of the CPE devices, such as display device 106, devices 112 or 110, external devices 242, or the like.

The cable interface 204 may receive a Data Over Cable Service Interface Specification (DOCSIS) signal or a DOCSIS signal combined with cable television signal from the broadband network connection 238, separate the cable television signal, if it exists, and provide the cable television signal to the audio/video interface 202. Cable interface 204 may also convert the DOCSIS packets into IP packets and provide them to the CPU 208, the local network adaptor 206, and/or the communication interface 108. The cable interface 204 also converts IP packets provided by the CPU 208, local network adaptor 206 and/or communications interface 248 into DOCSIS packets and may upload these DOCSIS packets to the MSO network 290 via the cable link 238, for example.

Figure 3:
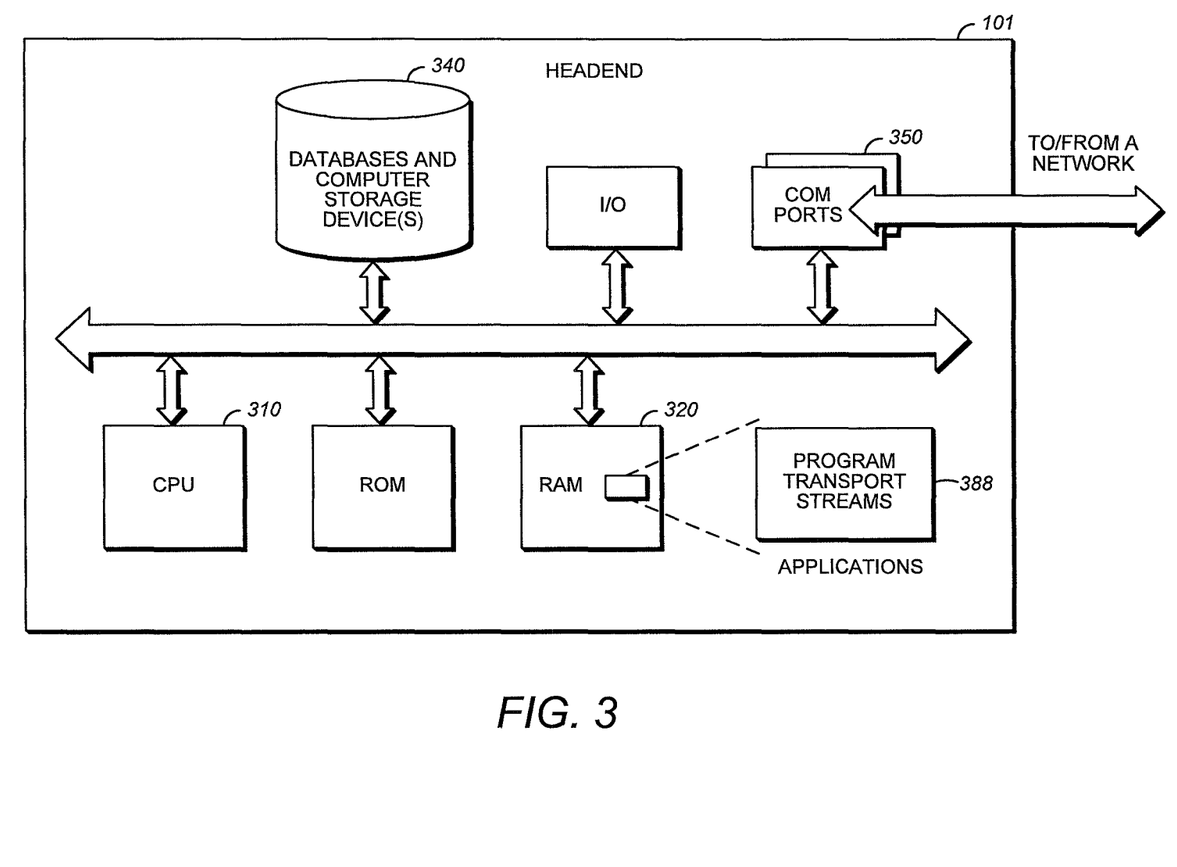
FIG. 3 illustrates an example of a hardware configuration for the headend 101 of FIG. 1.

FIG. 3 shows an example of a hardware configuration that may be used in the headend 101 in FIG. 1, in simplified block diagram form. The computer may be configured as a server or host to function as any of the computer platforms in FIG. 1. The headend 101 is typically optimized for video and related cable TV type network services or the like.

The example headend (HE) 101 includes a CPU 310, in the form of one or more processors, for executing program instructions. Although the processor(s) forming the CPU 310 may be similar to the microprocessor used in the handheld devices 110, 112, 113 of FIG. 1, host or server computer platforms typically use somewhat different circuit architectures, e.g. to provide more processing power. Headend 101 also includes a memory 320, such as RAM, that is accessible to the processor and stores program transport streams 388 which is the media to which the playback resume operations are to be applied to at the set-top box 104. The memory 320 also stores programming, such as applications, to deliver the program transport streams 388 via the cable or satellite network 102. Execution of the programming by the processor 310 configures the headend 101 to perform the functions or procedures as described below, for example in FIG. 4.

The server platform of the headend 101 typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

The example headend 101 includes a network communication interface, shown generally as corn ports 350, such as coaxial or optical communication ports. Com ports 350 allow the headend 101 to communicate with other devices and systems, via the cable or satellite network 102, such as set-top box 104. However, the corn ports 350 may use any available data communication technology. In a fixed installation, for example, the corn ports 350 may include an Ethernet interface card for communication over appropriate data network wiring. For a wireless implementation, the corn ports 350 may include a WiFi transceiver or a telecommunications receiver.

Figure 4:
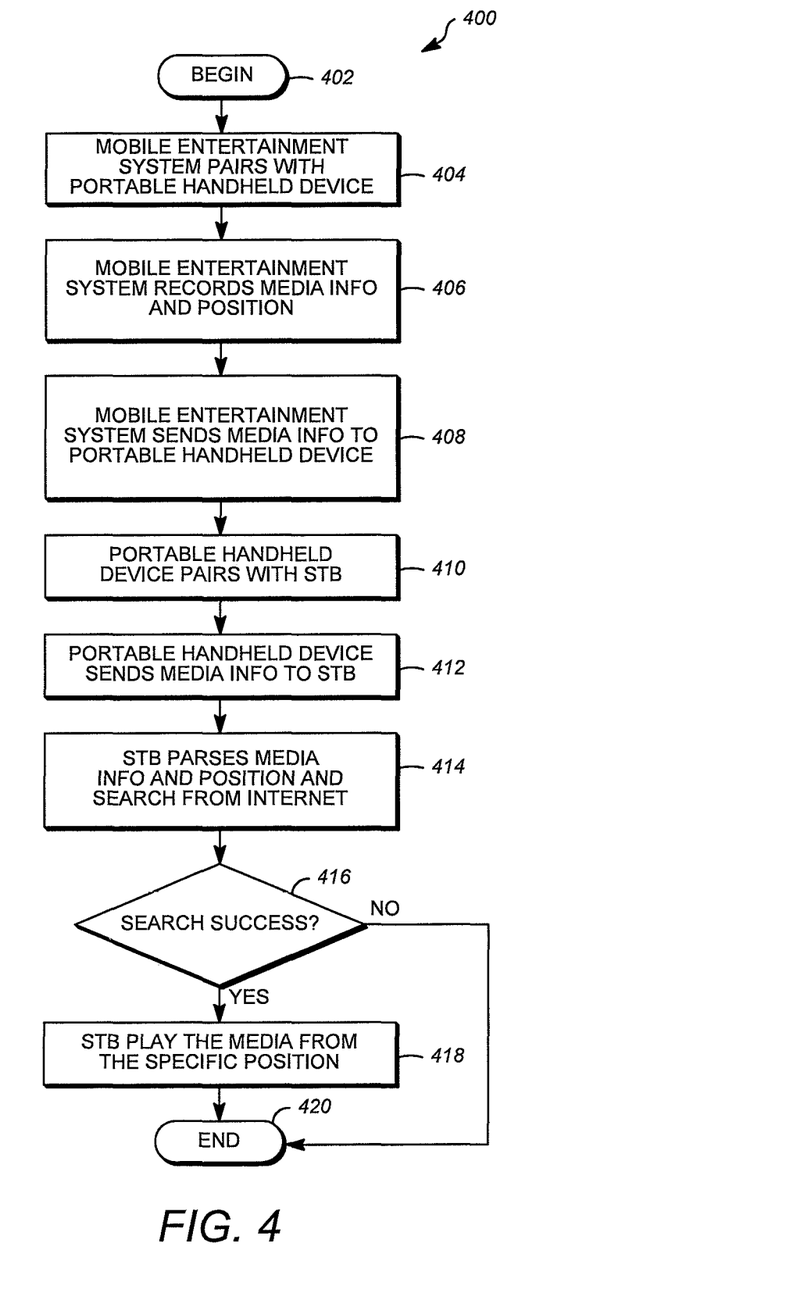
FIG. 4 is a flowchart of an example process executed by a system such as that shown in the examples described with reference to FIGS. 1-3 and 5.

FIG. 4 illustrates a procedural flow of the operation of the system in FIG. 1. The process begins at step 402. A user of the mobile entertainment system 115 within a car or vehicle may be listening to an audio broadcast of, for example, a sporting event, news or talk show program, or a music show on radio 118. The audio broadcast can be live or a previously recorded program that is received from an accessible network, for example, a satellite network 105 providing multimedia content via a network link 107. Alternatively, the user can receive multimedia content from the satellite network 105 containing a live video broadcast or previously recorded programming, for example, a video-on-demand movie or other programming. The video broadcast can be viewed on display 117 of the mobile entertainment system 115. The display 117 may include, for example, a flat panel liquid crystal display or light emitting diode (LED) display. At some point in time, before the audio or video broadcast is complete, the user decides to stop listening or watching the broadcast programming on the mobile entertainment system 115.

Prior to the user stopping the audio broadcast on radio, in step 404, the mobile entertainment system 115 opens a software application 116, such as MES playback resume application 186, and establishes a wireless communication network link, for example by pairing with a portable device through, for example, certain near field communication protocols, including Bluetooth®, NFC, ZigBee®, other mesh or other short range network, etc. Alternatively, the wireless communication network link can be via WiFi. The portable device includes, for example, a smartphone 112, laptop computer 110, tablet 113, or a smart bracelet 111. One of ordinary skill in the art would recognize that other portable devices may be used in the system.

Continuing to step 406, mobile entertainment system 115, using the MES playback resume app 186, tracks and records media identification and position information regarding the audio (radio) or video (VOD) broadcast from satellite network 105 in its memory 155. The media identification and position information 187 includes but is not limited to, for example, station identification, a time stamp and/or position information related to the ending position within the broadcast.

Figure 5:
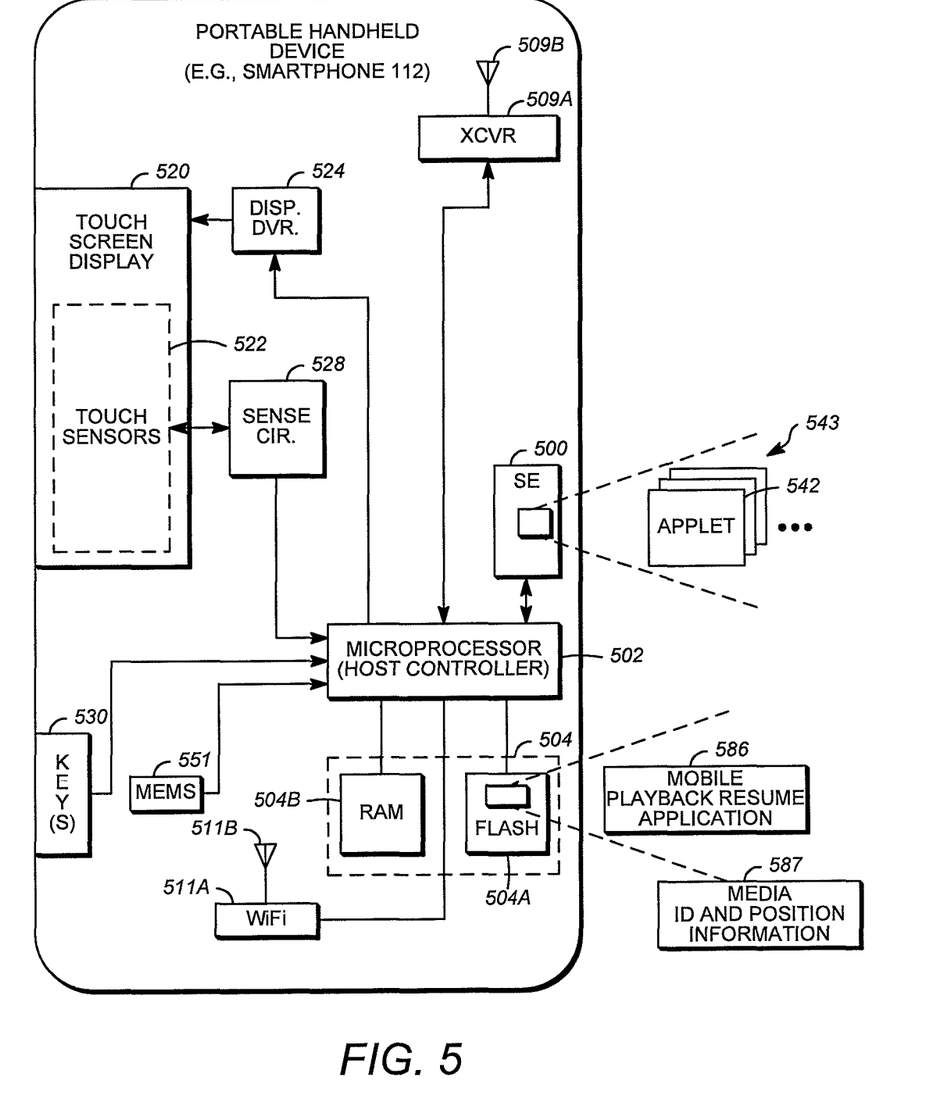
FIG. 5 illustrates a hardware configuration of a portable handheld device in FIG. 1, in a simplified block diagram form.

At step 408, the mobile entertainment system 115 sends the recorded media identification and position information 187 to one of the portable devices including the smartphone 112, laptop computer 110, tablet 113, or smart bracelet/watch 111. As shown in FIG. 5, the media identification and position information 587 is received and stored on the portable device using the mobile playback resume application 586 located on the portable device.

Continuing to step 410, the portable device having the recorded media identification and position information (shown as 587 in FIG. 5) from the mobile entertainment system 115 stored thereon establishes a wireless communication network link with the set-top box 104 through, for example, certain near field communication protocols, including Bluetooth®, NFC, ZigBee®, other mesh or other short range network (shown as SR network 170 in FIG. 1), etc. Alternatively, the wireless communication network link can be via WiFi.

In step 412, after establishing the wireless communication network link, for example by pairing with the set-top box 104, the portable device (smartphone 112, laptop computer 110, smart bracelet 111, or tablet 113) sends the recorded media identification and position information 587 (see FIG. 5) to the set-top box 104.

At step 414, the set-top box 104 parses the received media identification and position information 287 by executing the STB playback resume application 286 and searches at least one of a local accessible network or the internet using, for example, the wireless communication network 109 or the IP, cable or satellite network 102 via the set-top box network link 125. During the parsing, for example, an electronic programming guide (EPG), which is an interactive program guide that provides users of television, radio and other media applications with continuously updated menus displaying broadcast programming or scheduling information for current and upcoming programming, can be used to search for the audio or video broadcast from the mobile entertainment system 115. The EPG information may be supplied by, for example, audio and video content providers such as cable television companies, internet video and audio services, such as Netflix®, Roku®, Hulu®, CBS All Access®, Amazon® and the like, streaming audio services, such as Pandora®, iHeart® radio and the like, gaming sources, such a Xbox®, PlayStation®, Wii®, internet sources, as well as DVD players, CD players, cameras, computers, audio/video portable devices (e.g., iPods® and smartphones), and similar devices and services. In an alternate example to using the EPG, the parsing can be completed using a website interface of the internet video and audio content service providers such that the streaming audio, video or gaming services can be searched directly to locate the audio or video broadcast from the mobile entertainment system 115.

At step 416, if the search for the audio or video broadcast is successful, i.e., there is a program matching the media identification information and position information, then the process continues to step 418. In step 418, data content of the audio or video broadcast is downloaded to the headend 101, and the set-top box 104, via a connection to the headend 101, plays the multimedia content including the audio or video broadcast corresponding to the media identification and position information starting at the exact time at which the original broadcast or viewing was ended in the vehicle of the mobile entertainment system. The data content of the audio or video broadcast can also be downloaded directly to the set-top box 104. Alternatively, the downloaded data content from the headend 101 can be stored in the memory 220 of the set-top box 104. As a result, the user can resume playback of the audio or video broadcast or previously recorded media from the mobile entertainment system 115, and the process ends at step 420.

If in step 416, the search is not successful, i.e., no program is located that matches the media identification and position information, then the process ends at step 420 and the user is unable to resume playback of the audio or video broadcast from the mobile entertainment system 115. The process ends at step 420.

FIG. 5 is a high-level functional block diagram of an example of a portable handheld device, such as smartphone 112, which communicates via the system 100 of FIG. 1. Illustrated are elements of a touch screen type of portable handheld device having a mobile payback resume application 586 loaded thereon, although other non-touch type portable handheld devices can be used in the video and audio media playback resume protocols under consideration here. Examples of touch screen type portable handheld devices that may be used include (but are not limited to) a smart phone, a personal digital assistant (PDA), a tablet computer, a laptop computer, a smart bracelet or other portable device. However, the structure and operation of the touch screen type devices is provided by way of example; and the subject technology as described herein is not intended to be limited thereto. For purposes of this discussion, FIG. 5 therefore provides a block diagram illustration of the example smartphone 112 having a touch screen display for displaying content and receiving user input as (or as part of) the user interface.

The activities that are the focus of discussions here typically involve data communications. As shown in FIG. 5, the smartphone 112 includes at least one digital transceiver (XCVR) 509A, for digital wireless communications via a wide area wireless mobile telecommunication network, although the smartphone 112 may include additional digital or analog transceivers (not shown). The transceiver 509A (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 509A provides two-way wireless communication of information including digitized audio signals, still image and/or video signals, web page information for display as well as web related inputs, and various types of mobile message communications to/from the smartphone 112.

Several of these types of communications through the transceiver 509A and a network, as discussed previously, relate to protocols and procedures in support of communications with the set-top box 104 and wireless access point 108 or the cable or satellite network 102 to retrieve and display the multimedia content including the audio or video broadcast from the mobile entertainment system 115. Such communications, for example, may utilize IP packet data transport utilizing the digital wireless transceiver (XCVR) 509A and over the air communications to and from the set-top box 104 via the wireless access point 108 shown in FIG. 1.

In one example, the transceiver 509A sends and receives a variety of signaling messages in support of various data services provided by a network of a wireless service provider, to user(s) of smartphone 112 via a mobile communication network (not shown). Transceiver 509A connects through radio frequency (RF) send-and-receive amplifiers (not shown) to an antenna 509B.

Many modern portable handheld devices, such as smartphone 112, also support wireless local area network communications over WiFi, instead of or in addition to data communications using the wide area mobile telecommunication network. Hence, in the example of FIG. 5, for packet data communications, smartphone 112 also includes a WiFi transceiver 511A and associated antenna 511B. Although WiFi is used here as the example, the transceiver 511A may take the form of any available two-way wireless local area network (WLAN) transceiver of a type that is compatible with one or more standard protocols of communication implemented in wireless local area networks, such as one of the WiFi standards under IEEE 802.11 and/or WiMAX. In addition, smartphone 112 can include a Bluetooth® or ZigBee® (IEEE 180.15) transceiver (not shown) to communicate and interact with proximate Bluetooth® or other ZigBee®-equipped devices, such as set-top box 104 or the other portable handheld devices shown in FIG. 1.

The transceiver 511A, for example, may provide two-way data transport for wireless communication with a wireless access point (shown in FIG. 1) in a residence or enterprise that the user frequents or with any available hotspot offered in a public venue. A WiFi access point 108 may communicate with compatible user equipment, such as the smartphone 112, over the air using the applicable WiFi protocol. The WiFi access point provides network connectivity. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 511A supports various types of data communications similar to the packet data communications supported via the mobile network transceiver 509A, including communications related to communications to and from set-top box 104 and the other devices shown in FIG. 1.

The example smartphone 112 further includes a microprocessor, sometimes referred to herein as the host controller 502. A microprocessor or host controller 502 is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The microprocessor 502, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in smartphone 112, laptop computer 110, smart bracelet 111, and tablet 113.

Returning more specifically to the smartphone 112 example of FIG. 5, the microprocessor 502 serves as a programmable host controller for the portable handheld device by configuring the portable handheld device to perform various operations, for example, in accordance with instructions or programming executable by microprocessor 502. For example, such operations may include various general operations of the smartphone 112, as well as operations related to communications with set-top box 104 and mobile entertainment system 115 utilizing the playback resume application protocols described herein. Although a processor may be configured by use of hardwired logic, typical processors in portable handheld devices are general processing circuits configured by execution of programming.

The smartphone 112 includes a memory or storage system 504, for storing data and programming. In the example, the memory system 504 may include a flash memory 504A and a random access memory (RAM) 504B. The RAM 504B serves as short term storage for instructions and data being handled by the microprocessor 502, e.g. as a working data processing memory. The flash memory 504A typically provides longer term storage.

Hence, in the example of smartphone 112, the flash memory 504A is used to store programming or instructions for execution by the microprocessor 502. Depending on the type of device, the smartphone 112 stores media identification and position information 587 and runs a mobile operating system through which specific mobile applications, including mobile playback resume application 586 (which may be a web browser executing a dynamic web page), run on smartphone 112. Examples of mobile operating systems include Google Android, Apple iOS (I-Phone or iPad devices), Windows Mobile, Amazon Fire OS, RIM BlackBerry operating system, or the like. Flash memory 504A may also be used to store mobile configuration settings for different mobile applications or services executable at smartphone 112 using microprocessor 502.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The tablet computer 113, laptop computer 110, smart bracelet 111, and wireless access point 108 of FIG. 1 can be implemented in a somewhat similar fashion. A computer type user terminal device such as a PC, laptop computer, or tablet computer similarly includes one or more data communication interfaces (represented by COM ports), circuits forming one or more processors to implement a central processing unit (CPU) functionality, main memory and one or more mass storage devices for storing user data and the various executable programs for requesting and reproducing media content and receiving and processing indications as well as meta-data files containing information to facilitate content reproduction. A portable handheld device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Aspects of the exemplary system, apparatus and method outlined above may be embodied in programming, e.g. in the form of software, firmware, or microcode executable by a set top box, a remote control input device, a user computer system, a server computer, such as a media server, or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, such as comment-related input and/or voice-to-text translation applications from one computer or processor into another, for example, from a management server or host processor into the memory 320 of the set top box 311. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A set-top box, comprising:
a network communication interface;
memory configured to store instructions; and
a processor, coupled to the memory and the network communication interface, the processor being configured to execute the instructions to cause the set-top box to perform functions, including functions to:
receive media information associated with multimedia content including live broadcast multimedia content from a mobile application of a portable handheld device having the media information obtained from a mobile entertainment system, the mobile application, prior to interruption of the multimedia content, tracking and recording the media information including media identification of the multimedia content and position information identifying an interruption point in the multimedia content from a network accessible to the mobile entertainment system;
parse the media information including the media identification of the multimedia content and the position information identifying the interruption point in the multimedia content using at least one of a local or an internet based search via at least one of a wireless communication network or a headend of an IP, cable or satellite network to locate the multimedia content matching the media identification of the multimedia content and the position information identifying the interruption point in the multimedia content;
upon locating the multimedia content that matches the media identification of the multimedia content and the position information identifying the interruption point in the multimedia content, store the multimedia content that matches the media identification of the multimedia content and the position information identifying the interruption point in the multimedia content in memory for playback beginning at the interruption point in the multimedia content indicated in the position information at a later time; and upon receiving a resume playback operation, start play of the multimedia content beginning at the interruption point in the multimedia content indicated in the position information on at least one of a display device or an audio receiver accessible to the set-top box and the headend of the IP, cable or satellite network.

2. The set-top box of claim 1, wherein the processor parses the media information by:

searching at least one of a local network based or internet based programming information to locate data provided in the media information; and downloading the matching multimedia content to at least one of the set-top box or the headend of the IP, cable or satellite network.

3. The set-top box of claim 2, wherein the downloaded matching multimedia content is stored in the memory of the set-top box.

4. The set-top box of claim 2, wherein the downloaded matching multimedia content is sent to the set-top box or the headend of the IP, cable or satellite network in accordance with at least one of the data over cable service interface specification (DOCSIS) or internet protocol (IP).

5. The set-top box of claim 1, wherein the wireless communication network is a local area network (LAN) and the parsed media information is sent to the IP, cable or satellite network over the LAN.

6. The set-top box of claim 1, wherein the wireless communication network is a network operating according to Bluetooth, ZigBee, or WiFi protocol.

7. A method, comprising:

prior to interruption of the multimedia content, tracking and recording media information associated with multimedia content including live broadcast multimedia content from a mobile application of a mobile entertainment system, the media information including media identification of the multimedia content and position information identifying an interruption point in the multimedia content from a network accessible to the mobile entertainment system;

establishing a first wireless communication network link between the mobile entertainment system and a portable device;

sending the recorded media information including the media identification of the multimedia content and the position information identifying the interruption point in the multimedia content from the mobile entertainment system to the portable device, wherein the sent recorded media information is stored in a memory of the portable device using a mobile application;

establishing a second wireless communication network link between the portable device and a set-top box accessible to a headend of an IP, cable or satellite network;

sending the stored media information including the media identification of the multimedia content and the position information identifying the interruption point in the multimedia content from the portable device to the set-top box;

parsing the received media information including the media identification of the multimedia content and the position information identifying the interruption point in the multimedia content to locate the multimedia content matching the media identification of the multimedia content and the position information identifying the interruption point in the multimedia content using at least one of a local or an internet based search via the set-top box connected to at least one of a wireless communication network or the headend of the IP, cable or satellite network;

upon locating the multimedia content matching the media identification of the multimedia content and the position information identifying the interruption point in the multimedia content, storing the multimedia content that matches the media identification of the multimedia content and the position information identifying the interruption point in the multimedia content in memory of the set-top box for playback beginning at the interruption point in the multimedia content indicated in the position information at a later time; and upon receiving a resume playback operation, start playing the multimedia content beginning at the interruption point in the multimedia content indicated in the position information on at least one of a display device or an audio receiver accessible to the set-top box or the headend of the IP, cable or satellite network.

8. The method of claim 7, wherein the first wireless communication network link of the mobile entertainment system with the portable device and the second wireless communication network link of the portable device with the set-top box are completed through at least one of Bluetooth, NFC, WiFi, peer-to-peer, or ZigBee communication protocol.

9. The method of claim 7, wherein parsing the received media identification includes:

searching at least one of a local network based or internet based programming information to locate data provided in the media identification; and downloading the matching multimedia content to the set-top box or the headend of the IP, cable or satellite network.

10. The method of claim 9, wherein the downloaded multimedia content is stored in a memory of the set-top box.

11. The method of claim 9, wherein the downloaded multimedia content is sent to the set-top box or the headend of the IP, cable or satellite network in accordance with at least one of the data over cable service interface specification or internet protocol.

12. The method of claim 7, wherein the wireless communication network is a local area network (LAN) and the parsed media identification is sent to the IP, cable or satellite network over the LAN.

13. The method of claim 7, wherein the wireless communication network is a network operating according to Bluetooth, ZigBee, or WiFi protocol.

14. A non-transitory machine-readable medium containing machine-readable programming instructions, the instructions causing a processor of a set-top box to:

receive media information associated with multimedia content including live broadcast multimedia content from a mobile application of a portable handheld device having the media information obtained from a mobile entertainment system, the mobile application, prior to interruption of the multimedia content, tracking and recording the media information including media identification of the multimedia content and position information identifying an interruption point in the multimedia content from a network accessible to the mobile entertainment system;

parse the media information including the media identification of the multimedia content and the position information identifying the interruption point in the multimedia content using at least one of a local or an internet based search via at least one of a wireless communication network or a headend of an IP, cable or satellite network to locate the multimedia content matching the media identification of the multimedia content and the position information identifying the interruption point in the multimedia content;

upon locating the multimedia content that matches the media identification of the multimedia content of the multimedia content and the position information identifying the interruption point in the multimedia content, store the multimedia content that matches the media identification of the multimedia content and the position information identifying the interruption point in the multimedia content in memory of the set-top box for playback beginning at the interruption point in the multimedia content indicated in the position information at a later time; and upon receiving a resume playback operation, start play of the multimedia content beginning at the interruption point in the multimedia content indicated in the position information on at least one of a display device or an audio receiver accessible to the set-top box or the headend of the IP, cable or satellite network.

15. The non-transitory machine-readable medium of claim 14, wherein the instructions cause the processor of the set-top box to further parse the media information to:
search at least one of a local network base or internet based programming information to locate data provided in the media information; and
download the matching multimedia content to at least one of the set-top box or the headend of the IP, cable or satellite network.

16. The non-transitory machine-readable medium of claim 15, wherein the instructions cause the processor to store the matching multimedia content in a memory of the set-top box.

17. The non-transitory machine-readable medium of claim 15, wherein the instructions cause the downloaded matching multimedia content to be sent to the headend of the cable or satellite network in accordance with at least one of the data over cable service interface specification (DOCSIS) or internet protocol.

18. The non-transitory machine-readable medium of claim 14, wherein the wireless communication network is a local area network (LAN).

19. The non-transitory machine-readable medium of claim 15, wherein the wireless communication network is a network operating according to Bluetooth, ZigBee, or WiFi protocol.

20. The non-transitory machine-readable medium of claim 14, wherein the instructions cause the set-top box to wirelessly communicate with the portable device through at least one of Bluetooth, NFC, WiFi, peer-to-peer, or ZigBee communication protocol.

\* \* \* \* \*